(12) United States Patent  
Gerhard

(10) Patent No.: US 8,074,884 B2
(45) Date of Patent: Dec. 13, 2011

(54) CONCEALABLE CARD MODULE FOR A CASH REGISTER KEYBOARD

(75) Inventor: Hochgesang Gerhard, Bad Neustadt a. d. Saale (DE)

(73) Assignee: Preh KeyTech GmbH, Mellrichstadt (DE)

( * ) Notice: Subject to any disclaimer, the term of this patent is extended or adjusted under 35 U.S.C. 154(b) by 472 days.

(21) Appl. No.: 12/207,594

(22) Filed: Sep. 10, 2008

(65) Prior Publication Data

US 2009/0065585 A1    Mar. 12, 2009

(30) Foreign Application Priority Data

Sep. 10, 2007 (DE) .......................... 10 2007 042 856

(51) Int. Cl.
*G06K 7/00* (2006.01)

(52) U.S. Cl. ........ 235/439; 235/486; 235/380; 710/301; 902/34

(58) Field of Classification Search .................. 235/435, 235/439, 486, 380; 710/301; 902/34
See application file for complete search history.

(56) References Cited

U.S. PATENT DOCUMENTS

| | | | | |
|---|---|---|---|---|
| 4,870,604 A * | 9/1989 | Tatsuno | ................... | 361/679.09 |
| 5,265,951 A | 11/1993 | Kumar | | |
| 5,612,691 A | 3/1997 | Murmann et al. | | |
| 6,651,881 B1 * | 11/2003 | Choiset | ......................... | 235/380 |
| 2004/0019724 A1 * | 1/2004 | Singleton et al. | ............. | 710/303 |
| 2004/0068601 A1 * | 4/2004 | Kang et al. | ..................... | 710/301 |
| 2005/0139660 A1 * | 6/2005 | Maxymych et al. | .......... | 235/383 |
| 2005/0167138 A1 | 8/2005 | McCarthy | | |
| 2006/0081707 A1 * | 4/2006 | Yang | ............................. | 235/441 |

FOREIGN PATENT DOCUMENTS

| | | | |
|---|---|---|---|
| DE | 44 08 330 A1 | | 9/1995 |
| DE | 298 04 165 U1 | | 6/1998 |
| DE | 102 16 936 A1 | | 11/2003 |
| DE | 20 2005 006 692 U1 | | 8/2005 |
| JP | 2003067115 A | * | 3/2003 |
| WO | WO 99/46669 A1 | | 9/1999 |

* cited by examiner

*Primary Examiner* — Thien M. Le
*Assistant Examiner* — Christle I Marshall
(74) *Attorney, Agent, or Firm* — Muncy, Geissler, Olds & Lowe, PLLC

(57) ABSTRACT

The invention relates to a keyboard (1) for data input, particularly a POS keyboard (1), with a key field (2) and at least one card reading device (6), for the reading of data from a card (13) provided with data, whereby the device (6) has a shaft (12), into which the card (13) can be inserted and in which the card (13) can be held, whereby the card reading device (6) is integrated pivotably into a surface (8) of the housing (9) of the keyboard (1).

13 Claims, 2 Drawing Sheets

CONCEALABLE CARD MODULE FOR A CASH REGISTER KEYBOARD

Figure 1:
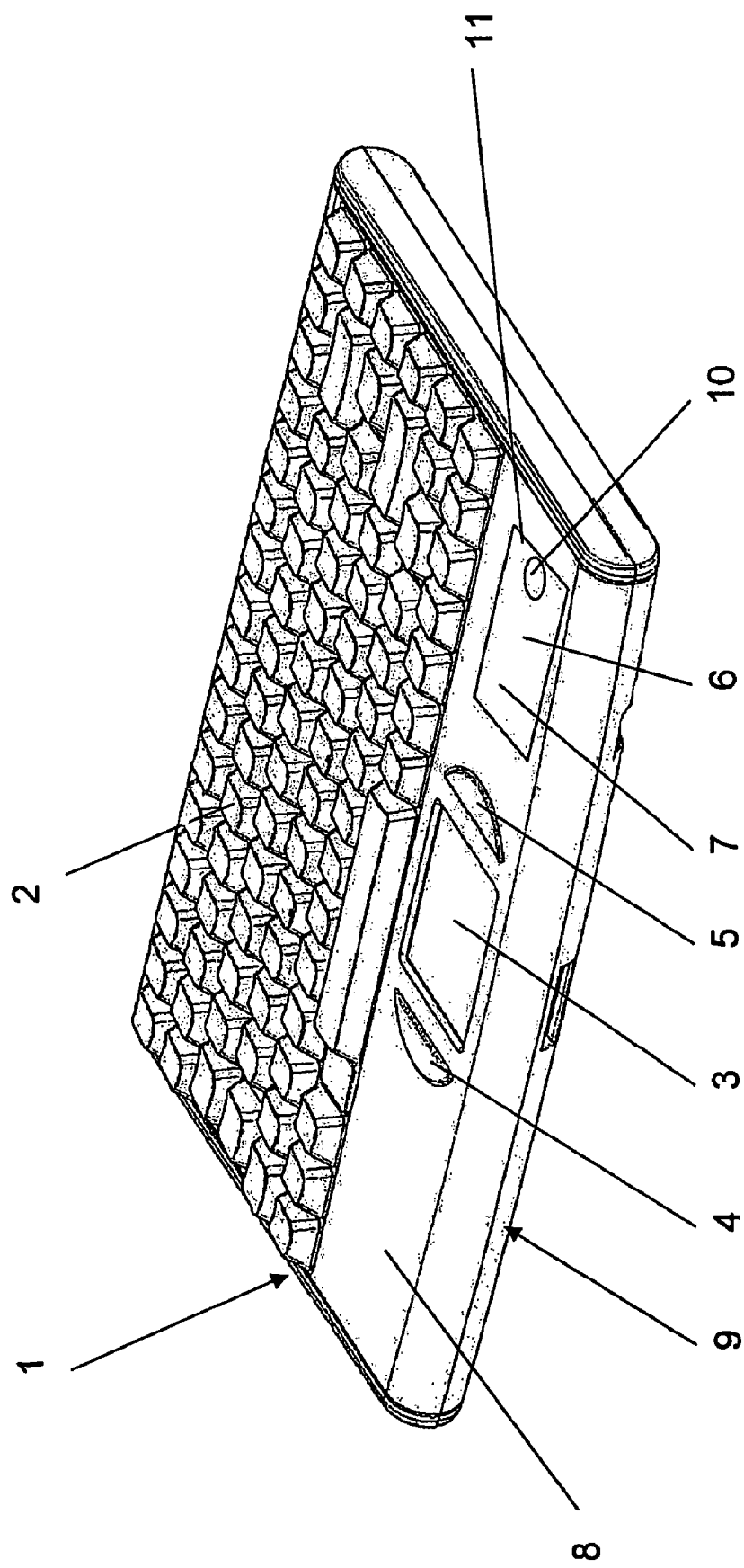

This nonprovisional application claims priority under 35 U.S.C. §119(a) to German Patent Application No. 10 2007 042 856.3, which was filed in Germany on Sep. 10, 2007, and which is herein incorporated by reference.

The invention relates to a keyboard for data input, particularly a point of sale keyboard (POS keyboard), with a key field, at least one card reading device, for the reading of data from a card, whereby the device has a shaft into which the card can be inserted and in which the card can be held.

It is typical for current cash register keyboards that they have a device by means of which cards provided with data can be read. To this end, these cash register keyboards have insertion slots, swipe slots, or shafts into which the cards can pushed or through which they can be drawn. The inserted cards contain data, which, for example, enable authorization or personalization of the cash register keyboards. Thus, it is often the case particularly in POS keyboards that different persons use one and same keyboard or cash register. For authorization or for personalization, the cards can then be inserted into the card reader in order, for example, to obtain a release to use a keyboard or cash register.

A keyboard for data cash registers, equipped with a card reader, is disclosed in Unexamined German Patent Application No. DE 102 16 936 A1. A card reader is described in the form of a swipe slot and also in the form of an insertion shaft. Keyboards of this type are used, for example, in sales processes or in provision of services, in which payment occurs without cash by means of magnetic strips and/or chip cards or in which the access to data is made secure by a magnetic strip and/or chip card. A disadvantage here, however, is that to insert the data card a free space must be present above the insertion shaft or swipe slot.

To protect a card reading device from dust and dirt, a card reading device known from U.S. Pat. No. 5,265,951, in which the insertion slot or insertion shaft is placed laterally on one side in a surface turned away from the user and in which the insertion slot for the card is protected by elastic flaps. In one respect, direct penetration of dust and dirt is prevented by the lateral arrangement and moreover the plastic flaps protect the card reading device from dirt. It is a disadvantage here that a relatively large free space must be present next to the card reading device, because the card must be positioned with its entire length next to the device in order to be inserted perpendicular into the card reading shaft.

To be able to connect peripheral devices to an industrial PC, a data input device is known from German Utility Model DE 20 2005 006 692 U1, in which ports, particularly outlets, are made in a surface facing the user. To protect the outlets, a cover strip is arranged above the sockets and covers the sockets and moreover closes the sockets flush with a surface of the input unit. It is an interfering factor here, however, that in the case when the sockets are covered with a plug, the free space for using the industrial PC is restricted.

It is known, furthermore, and described in U.S. Patent Application No. 2005/0167138 A1, to integrate sockets under a pivotable cover in a surface, so that in the case when the sockets are not needed, a flat surface is available.

Proceeding from the state of the art, the object of the invention is to develop a keyboard for data input, in which the free space for the placement of the keyboard can be freely selected. Moreover, the object is to provide a keyboard whose card reading device is as resistant as possible to becoming dusty and/or dirty.

The object of the invention is attained in that the card reading device is integrated pivotably into a surface of the keyboard.

The pivotable incorporation of the card reading device in the keyboard has now made it possible to place the keyboard in any free space, without concern for a free space around the keyboard. Moreover, the invention offers the advantage that an inwardly pivotable card reading device in the keyboard, on the one hand, protects the insertion shaft or insertion slot from dust and dirt and, moreover, the advantage that the inserted card is held securely in the keyboard. This is of advantage particularly when this concerns POS keyboards, which are used to some extent also in a very dirty environment or even outdoors, where becoming dirty is virtually unavoidable. The configuration of the card reading device according to the invention, which is used pivotable in the keyboard, moreover, can naturally also be used in conventional input keyboards. The presence of a key field, a card reader (MSR), and/or a smart card reader and/or comparable devices for reading of data stored on cards is essential to the invention. It is also pointed out here that a card reading device integrated into the keyboard according to the invention naturally can be present multiply in the keyboard, for example, for different card formats or requirements. Keyboards of this type are used, for example, in sales processes and in the provision of services, in which the payment occurs without cash by means of magnetic strips and/or chip cards or in which the access to data is made secure by a magnetic strip and/or a chip card.

In an advantageous embodiment variant of the invention, the keyboard has below the key field a surface which is extended to the user and in which, for example, also a touch-sensitive input surface can be integrated. The pivotable card reading device is integrated into this surface. This offers the advantage that the card to be inserted by the keyboard user is directly in the user's access area and the user can insert the card very easily. The insertion of the card can be facilitated here also by additional information, which shows, for example, the orientation of the card during insertion into the insertion shaft, because the card reading device is directly within the keyboard user's field of vision. Thus, the user is able to insert the card very easily, after which he pivots the card reader device inward into the keyboard and closes it advantageously flush with the surface of the keyboard. This in turn offers the advantage that the keyboard is freely accessible to the user, without, for example, a card projecting from the keyboard, which in turn would restrict accessibility and the user's freedom of movement.

In another advantageous embodiment of the invention, the card reading module can be pivoted from the position closing flush with the surface of the keyboard by a predefinable angle such as, for example, 15°, 30°, 45°, 60°, 75°, or 90° and can be brought into a stop position corresponding to the degree values. In this position, the card can also be inserted with one hand, so that easy usability is present during insertion of the card.

The card reading device is advantageously made as a module, in other words, that a read head necessary for reading the data on the card is integrated into the card reading device. Thus, the card reading device consists of an exterior wall forming a part of the surface of the keyboard housing, an insertion shaft, or also a module shaft for taking up the card, and at least one read head for reading the data on the card inserted in the module shaft. In this case, the card reading device is integrated pivotably into the keyboard housing. Apart from the realization of stop positions during the pivoting of the card reading device out of the keyboard in different stop positions, it is conceivable, moreover, to pivot the card reading module spring-loaded out of the housing. It is possible in this case according to the invention that the card reading module is held in its inwardly pivoted position by means of releasable fixing or holding devices in its inwardly pivoted position and is released by the holding device by means of actuation, for example, pressing on the card reading device, so that the card reading device is pivoted from the integrated position by means of spring force.

The modular configuration of the card reading device, moreover, offers the advantage that the card reading module can be fabricated independent of the keyboards and depending on the customer's wish integrated into different keyboards or differently equipped keyboards.

The invention will be described in greater detail below with use of an exemplary embodiment.

Figure 2:
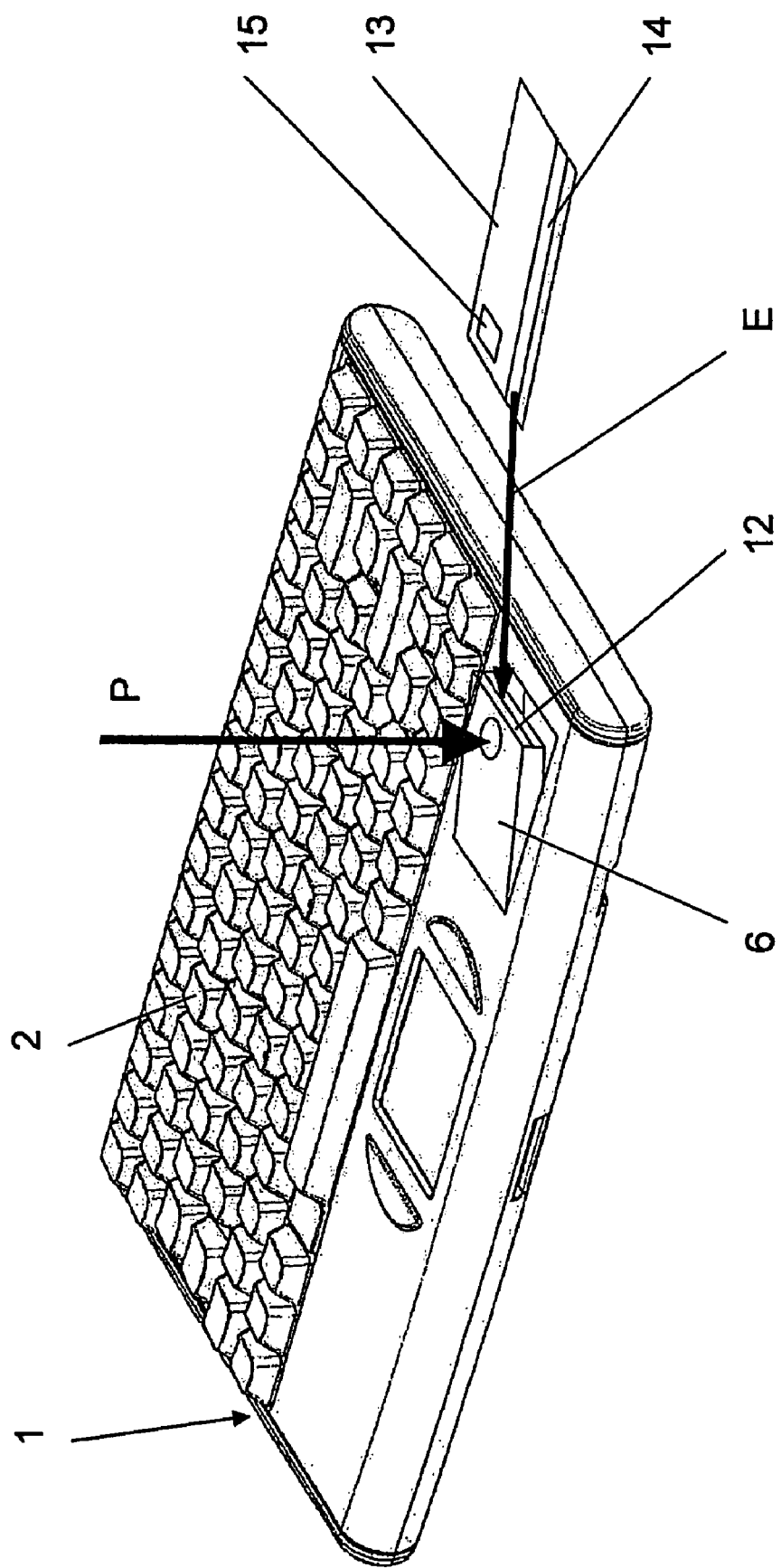

The figures show:

FIG. 1 a three-dimensional view of a keyboard equipped according to the invention with a key field, a touch-sensitive key field, and a card reading device integrated into the surface of the keyboard and FIG. 2 a likewise three-dimensional view of a keyboard with a key field, touch-sensitive input field, and a card reading module pivoted out of the housing.

A keyboard 1 with a key field 2, a touch-sensitive input field 3, manual input keys 4, 5, and a card reading device 6 is shown in a three-dimensional view in FIG. 1. As shown, keyboard 1 is an input keyboard or a POS keyboard, which is equipped with a card reading module 6 and which can be connected to a computer and/or monitor.

In this view, surface 7 of card reading module 6 closes flush with a surface 8 of housing 9 of keyboard 1, said surface facing the user. Preferably, surface 7 of card reading module 6 is made of the same material as housing 9 of keyboard 1, so that visually as well a flush and closed picture of surface 7, 8 of housing 9 is produced.

Card reading device 6 is integrated into POS keyboard 1. Integrated in this case means that card reading device 6 is built into keyboard 1 in such a way that, on the one hand, a closed surface 8 of the keyboard results and, on the other, that card reading device 6 is built into keyboard 1 movably, preferably pivotably.

Card reading device 6 is shown in a closed position below key field 2 in keyboard 1. In order to pivot the card reading device out of keyboard surface 8, the user must actuate the card reading device manually by pressing on card reading module 6, for example, in the direction of arrow P. For this purpose, for example, a visual mark 10 is placed on surface 7 of card reading module 6. It is also conceivable to render the mark 10 as an engraving, indentation, symbol, or the like. It is also conceivable that a notch is made on side 11, to be opened, of card reading module 6, so that the user can grasp surface 7 or reach behind said surface of card reading module 6 using a finger to pivot card reading module 6 out of the closed position. It is naturally also conceivable that the card reading module can be moved outward by electrical or electromechanical means.

FIG. 2 shows keyboard 1 of the invention also in a three-dimensional top plan view, whereby card reading module 6 is shown pivoted out of surface 8 of housing 9. Card reading module 6 in this case is pivoted out of housing 9 so far that a card provided with data can be inserted into the module shaft or insertion slot 12 of card reading module 6, as shown by arrow E. It is pointed out here that in the shown exemplary embodiment, card 13 can be inserted completely into the card reading module, so that card reading module 6 after closing is completely integrated into housing 9 of keyboard 1. Card reading module 6 in this case has at least one read head, so that a magnetic strip 14 and/or a chip card 15 can be analyzed. By means of the information stored on the card, the keyboard can then be personalized, for example, in other words, adapted to the particular user and/or the card is used as authorization for using keyboard 1.

It is pointed out only for the sake of formality that the keyboard can be connected to a computer and/or monitor. The configuration of a keyboard according to the invention enables the use of cards 13, without these projecting beyond the contours of keyboard 1, so that when the card module is not being used it is pivoted inward and has protection from dust and moisture.

The invention claimed is:

1. A keyboard for data input, particularly a POS keyboard, with a key field and at least one card reading device, for the reading of data on a card provided with data, whereby the device has a shaft, into which the card can be inserted and in which the card can be held, whereby the card reading device is integrated pivotably into a surface of the keyboard, characterized in that the card reading device in the inwardly pivoted state closes flush with the surface of the keyboard, whereby the card reading device can be fixed in the keyboard in the flush position, so that the card reading device can be held in the flush position and the card reading device forms a part of the surface of the keyboard housing, wherein the key field is oriented for use by a user positioned at a given edge of the keyboard, and the card reading device is disposed between the key field and the given edge of the keyboard.

2. The keyboard according to claim 1, wherein the card reading device can be pivoted into the surface and out of the surface of the keyboard and the data card can be inserted in the outwardly pivoted state of the card reading device.

3. The keyboard according to claim 1, wherein the card reading device is integrated into a surface of the keyboard, said surface facing the user.

4. The keyboard according to claim 1, wherein the card reading device is integrated into a plane of the key field of the keyboard.

5. The keyboard according to claim 1, wherein the card reading device can be pivoted inward in stop positions, whereby the data card can be slid into the shaft in the stop positions.

6. The keyboard according to claim 1, wherein the data card can be slid completely into the shaft.

7. The keyboard according to claim 1, wherein the data card can be slid partially into the shaft.

8. The keyboard according to claim 1, wherein the keyboard has below the key field a touch-sensitive area, supporting the input of data, and at least one input key next to the surface and the card reading device is also arranged below the key field next to the surface.

9. The keyboard according to claim 1, wherein the card reading device is disposed adjacent to a touch sensor integrated into the keyboard.

10. The keyboard according to claim 1, wherein the card reading device is configured to read data from an inserted card in the inwardly pivoted state.

11. A keyboard for data input, comprising:
a key field oriented for use by a user positioned at a given edge of the keyboard; and
at least one card reading device integrated pivotably into a surface of the keyboard between the key field and the given edge of the keyboard such that, in an inwardly pivoted state, the card reading device closes flush with the surface of the keyboard.

12. The keyboard according to claim 11, further comprising a touch sensor disposed adjacent to the card reading device between the key field and the given edge of the keyboard.

13. The keyboard according to claim 11, wherein the card reading device is configured to read data from an inserted card in the inwardly pivoted state.

* * * * *